Dec. 10, 1968  J. E. GOODMAN ET AL  3,415,548

TRANSDUCER MOUNTING

Filed Sept. 16, 1965  2 Sheets-Sheet 1

INVENTOR:
JOHN EDWARD GOODMAN &
ARTHUR GRANGE
BY
Abraham A. Saffitz
ATTORNEY

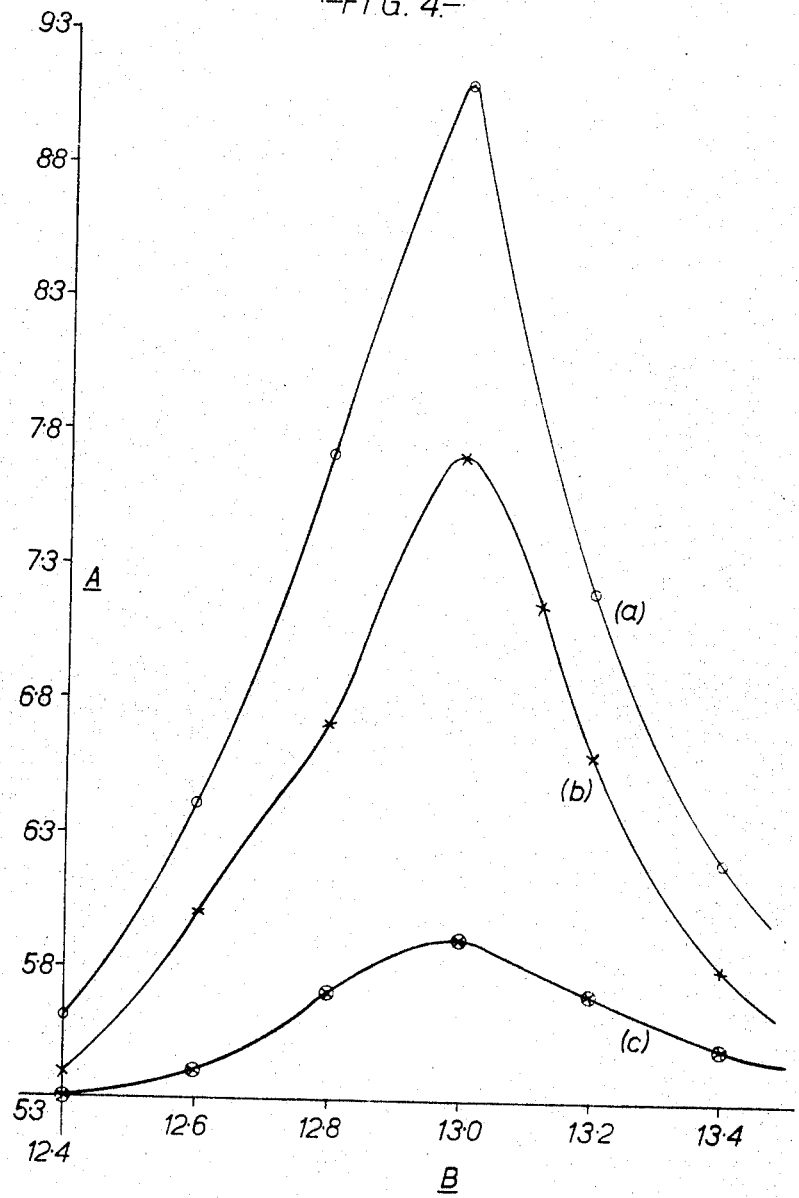

United States Patent Office 3,415,548
Patented Dec. 10, 1968

3,415,548
TRANSDUCER MOUNTING
John Edward Goodman, Rawdon, and Arthur Grange, Ilkley, England, assignors to Ultrasonics Limited, Shipley, England
Filed Sept. 16, 1965, Ser. No. 487,787
2 Claims. (Cl. 287—20)

ABSTRACT OF THE DISCLOSURE

A mounting for a transducer probe assembly which is placed at the inner wall of a vessel containing a liquid subjected to ultrasonic energy comprising a flange located adjacent the nodal plane of the vibrations in the vessel and shaped in a circle having the smallest convenient diameter in relation to the vessel, the flange having a groove bearing against the inner wall of the vessel, a resilient sealing ring in the groove, a bearing collar freely surrounding the probe on the outer face of the vessel, a thrust ring freely mounted and surrounding the probe adjacent the collar, a circularly shaped split ring fitted in an annular groove in the probe which is tensioned in the longitudinal direction away from the flange to serve as a buttress for the thrust ring when the bearing elements are fastened to mount the assembly in a tightened condition.

---

This invention relates to the mounting of transducers on vessels for containing a liquid cleaning medium by which materials or articles are to be cleaned by sonic or ultrasonic energy.

The use of sonic or ultrasonic energy for cleaning of metallic materials (e.g. strip or wire) or metal components at various stages of manufacture is now a well established practice. It has been established that sound energy has to be converted to cavitation in the cleaning medium in order to obtain worthwhile results. While workers in this field up to about the year 1955 mainly tried to use frequencies about 40 kc./s. and in some cases even as high as 1,000 kc./s., it is now generally accepted that much lower frequencies give better results, because at lower frequencies a high level of cavitation can be more efficiently produced in a given cleaning medium.

Any cleaning process which is carried out in a liquid medium must begin with a suitable vessel. When sonic and ultrasonic energy were first used, the apparatus was of small size and, in consequence, the vessels were also small. The simplest manner of transferring the sound energy of a transducer to a vessel filled with liquid is to attach them to the bottom or sides of the vessel. Both magnetostrictive and piezoelectric transducers were used in this manner. It follows that this method of attachment vibrates the entire vessel and its mounting. One could demonstrate that this method causes inefficiency in the transfer of the energy, but we are particularly concerned with the use of sonics and ultrasonics in large installations where large tanks are required. Large tanks must be manufactured in materials of a certain minimum thickness to give them the requisite strength, and insufficiently thick tanks fabricated of metal plates, for example, metal plates 12.5 mm. thick, could not be used as transmitting membranes in industrial use.

Following this reasoning, we have employed resonant probes to transmit the energy into the liquid and this method is well known to people versed in the art. However, experience has shown that various difficulties can also be encountered in the mounting of such probes. When screws are used, there is a tendency for distortion of either the tank bottom or side or the flange of the probe: in consequence, the compression of the sealing medium between the flange and the tank bottom, e.g. a rubber gasket, is reduced in the spaces between the screw holes, and there is a great risk of leakage. Since the cleaning medium is often aqueous and sometimes corrosive, leakage can cause damage to the transducers which are fixed to the bottom of the probe. Also, the screw holes themselves have to be sealed and this becomes a difficult procedure when the liquid in the tank is to be used at elevated temperatures, because of the difference in the coefficient of expansion of the various components.

Another even more serious problem concerns the chemical attack on the sealing medium which can give rise either to swelling or to complete breakdown. Our attempts to overcome these problems by using such new materials as P.T.F.E. (polytetrafluoroethylene) have met with little success because of the "cold flow" characteristics which result in more or less permanent deformation due to heat. At one stage in our experiments we used what might be considered the ideal seal, namely welding the probe to the tank at a flange at the nodal plane. This seemed to be satisfactory as long as thin sheet was used for the tank bottom or side, but when the probe was attached to a thick plate we found that a lot of energy was transmitted to the tank bottom or side, instead of being transmitted to the cleaning medium from the end of the probe as was desired. When the plate forming the tank bottom or side was as thick as 12.5 mm. the damping of the output of the probe was substantial and the system became inefficient.

Thus there are three major problems which have to be overcome in order to obtain a satisfactory probe mounting:

(1) To prevent leakage of liquid under various conditions;
(2) To minimise the damping of the probe's vibrations by its supporting structure; and a third problem which is to be solved in order to provide a practical apparatus;
(3) To accommodate varying thicknesses of plate which form the bottom or the side of a vessel.

With a view to overcoming these problems a probe mounting according to the present invention includes a probe flange for locating against the inner face of the vessel bottom or side, a resilient sealing ring housed in an annular groove in the face of the probe flange which abuts the vessel, a bearing collar freely surrounding the probe on the outer face of the vessel bottom or side, a thrust ring freely surrounding the probe adjacent said collar and arranged to bear against the probe in the longitudinal direction away from said flange, and adjustable means associated with said thrust ring for clamping said flange and collar against opposite faces of the vessel bottom or side with said sealing ring compressed.

In order that the invention may be fully and clearly comprehended, the same will now be described with reference to the accompanying drawings, where:

FIGURE 4 is a comparative graph showing three transducer resonance curves.

Figure 3:
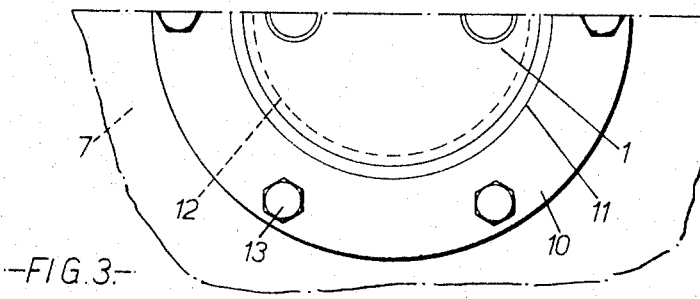
FIGURES 2 and 3 are respectively a part plan and a part underplan of the arrangement shown in FIGURE 1, the transducers being omitted from FIGURE 3.
Figure 1:
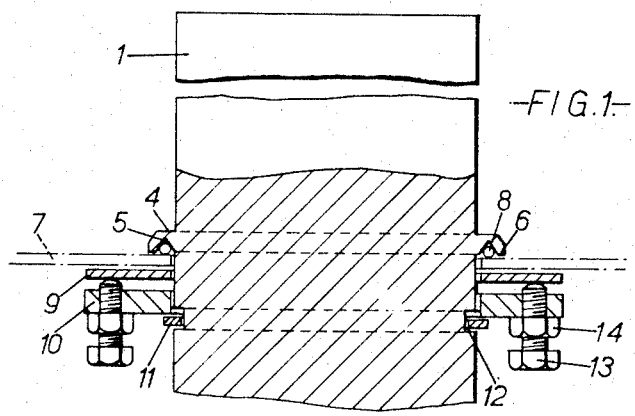
FIGURE 1 illustrates mainly in longitudinal section a transducer probe mounted in the bottom of a vessel according to one embodiment of the invention, the vessel bottom being indicated by broken lines and the parts being shown as they would appear before the clamping operation is completed.
Figure 2:
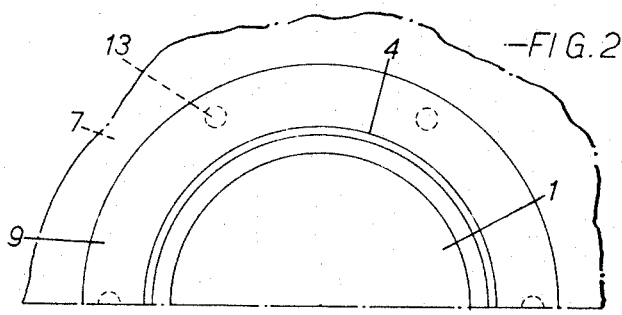

Referring first to FIGURES 1 to 3, the outer end of the cylindrical probe 1 has two transducers 2 secured thereto by screw-threaded plugs 3. Near its nodal plane it has a flange 4 of the smallest convenient diameter on the underside of which is an annular V groove 5 which leaves only a narrow perimetral bearing surface 6 by which the flange can contact the inner face of the vessel bottom 7. Within this groove 5 is housed a resilient sealing ring 8 of circular cross-section and of such a thickness as to be deformed by compression when the probe flange is forced against the vessel bottom.

A bearing collar 9 freely surrounds the probe so as to be capable of bearing against the underside of the vessel bottom, and below this is a thrust ring 10 also freely surrounding the probe but anchored longitudinally thereon by a circularly shaped split spring ring 11 which is sprung into an annular groove 12 in the probe. Through this thrust ring 10 are screwed a number of clamping studs 13 with locknuts 14, these studs being equally spaced around the ring.

The probe is passed through the hole in the vessel bottom from the inside, the collar and ring passed over its outer end and the ring 11 sprung into the groove 12 to retain them in position and also to act as a buttress for the thrust ring 10 when the studs 13 are tightened to clamp the vessel bottom between the flange 4 and collar 9. This clamping action serves to mount the probe in the vessel in a liquid-tight manner due to the compression of the sealing ring 8 and, although the face 6 of the flange contacts the vessel, the small diameter of the flange and the small area of the surface 6 together with the flexibility of the collar 9 produce a considerable degree of flexibility in the mounting which greatly reduces its damping effect on the vibrations of the probe. Moreover it will be seen that the overall depth or thickness of the mounting about the nodal plane of the probe is rendered small compared with the length of the probe, and this also minimises the restrictive effect which any mounting must have on the freedom of the probe to vibrate.

The beneficial effect of using a transducer mounting according to this invention is illustrated by the graph in FIGURE 4. One method of assessing transducer performance is to measure the coupling coefficient, which can be done by plotting the transducer resonance curve, and this has been done in the graph where the vertical coordinates represent meter readings in milliamperes and the horizontal co-ordinates represent frequency in kilocycles/second. Curve (a) is that of a stainless steel probe working free, that is to say, not attached to anything—this, of course, is ideal but not feasible in practice; (c) shows the curve of a similar probe welded to a 12.5 mm. thick plate by means of a flange at the nodal plane, resulting in a far too rigid mounting; and (b) is the curve of a similar probe mounted also in a 12.5 mm. thick plate in accordance with this invention. This latter curve shows that the amount of vibration transmitted by the probe to the contents of the vessel is very high even with a comparatively thick wall which would be necessary for a large vessel.

It should be noted that, while the above mentioned method of assessing transducer efficiency is directly applicable to low and medium power applications of ultrasonics, it serves only as a guide to the performance which may be expected in the case of truly high power ultrasonics with high loading factors.

It has been demonstrated that the mounting according to this invention can withstand the tendency of solvents and corrosive liquids to attach the sealing ring 8 by reason of this ring being housed in a restraining groove which locates it even when it is deformed by compression.

It will be seen that the mounting according to this invention can accommodate varying thicknesses of vessel wall, so that one standard mounting can be supplied for numerous different vessels. A further advantage is that, due to its small overall diameter, a large number of accurately machined probes can be fitted to very large vessels.

Whilst the hereinbefore described embodiments of the invention have been mentioned merely by way of example, it is to be understood that other suitable embodiments may be evolved for carrying out the invention and that protection is hereby claimed for all such embodiments within the scope of the appended claims.

We claim:

1. An assembly of a transducer probe in the wall of a vessel for containing a liquid cleaning medium to which sonic and ultrasonic vibrations are to be transmitted from the probe to clean materials placed in the vessel, said assembly comprising in combination a cylindrical probe having a substantially circular mounting flange near its nodal plane for locating the transducer probe against an inner wall of the vessel, said flange being being indented to form a groove and having a narrow perimetral projecting surface or relatively narrow radial dimension in contact with the inner wall of the vessel, a resilient sealing ring in said groove which is deformed by compression when the flange is forced against the inner wall of the vessel, a freely mounted bearing collar surrounding the probe on the outer face of the vessel wall, fastening means including clamping means and a thrust ring freely mounted and surrounding the probe adjacent said collar, said probe being further provided with an annular groove which is located below the flange groove and below said collar, a circularly shaped split spring ring fitted in the annular groove of the probe which is tensioned in the longitudinal direction away from said flange on tightening the assembly, said split spring ring serving as a buttress for said thrust ring when said clamping means are in tightened condition, and clamping means forcing the probe into liquid-tight relation against the inner wall of the vessel with the sealing ring in bearing engagement against said vessel inner wall, said clamping means being located radially outwardly of said perimetral projecting surface.

2. An assembly as claimed in claim 1 wherein adjustable means are associated with said thrust ring for clamping said flange and collar against opposite faces of the vessel wall with said sealing ring compressed, said clamping means consisting of a set of screw-threaded clamping studs screwed through said thrust ring and arranged to bear against said bearing collar to clamp the vessel wall between the probe flange and collar and wherein said groove in said flange is an annular groove of generally V-shaped cross section.

References Cited

UNITED STATES PATENTS

| 2,739,317 | 3/1956 | Abresch | 285—158 |
| 3,214,511 | 10/1965 | Franklin | 285—158 |
| 3,246,132 | 4/1966 | Jordan et al. | 285—158 |

FOREIGN PATENTS

| 209,164 | 1957 | Australia. |

CARL W. TOMLIN, *Primary Examiner.*

W. L. SHEDD, *Assistant Examiner.*

U.S. Cl. X.R.

285—158, 194; 68—3; 259—1